UNITED STATES PATENT OFFICE.

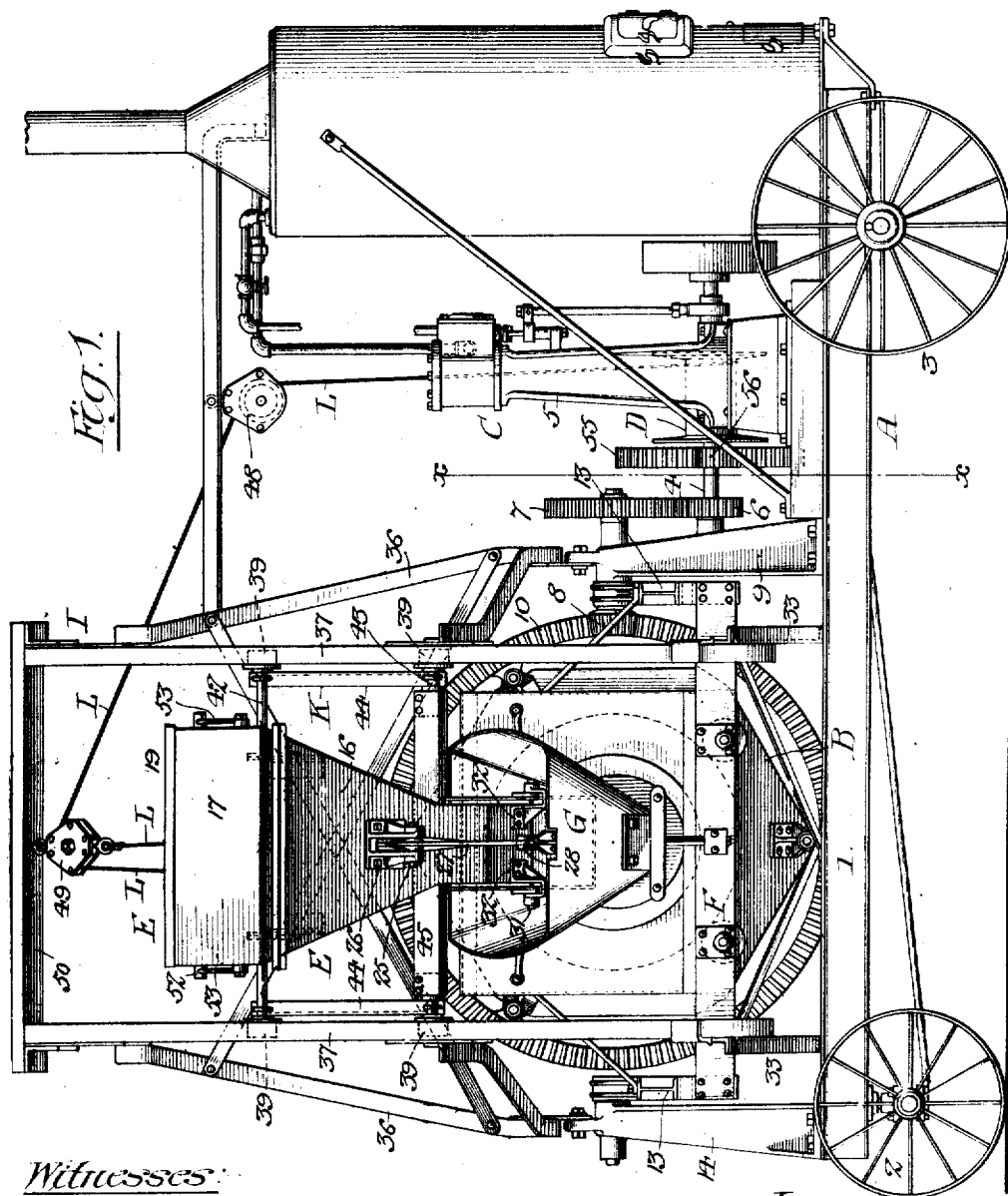

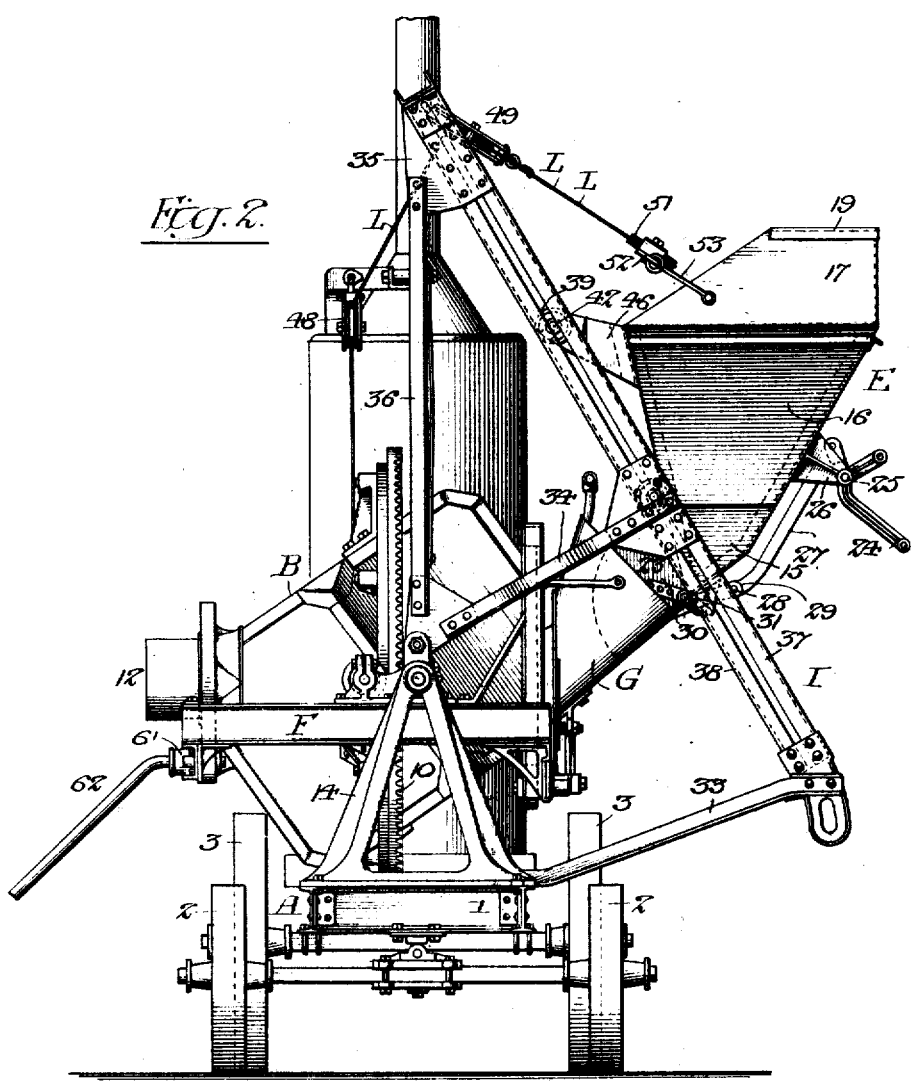

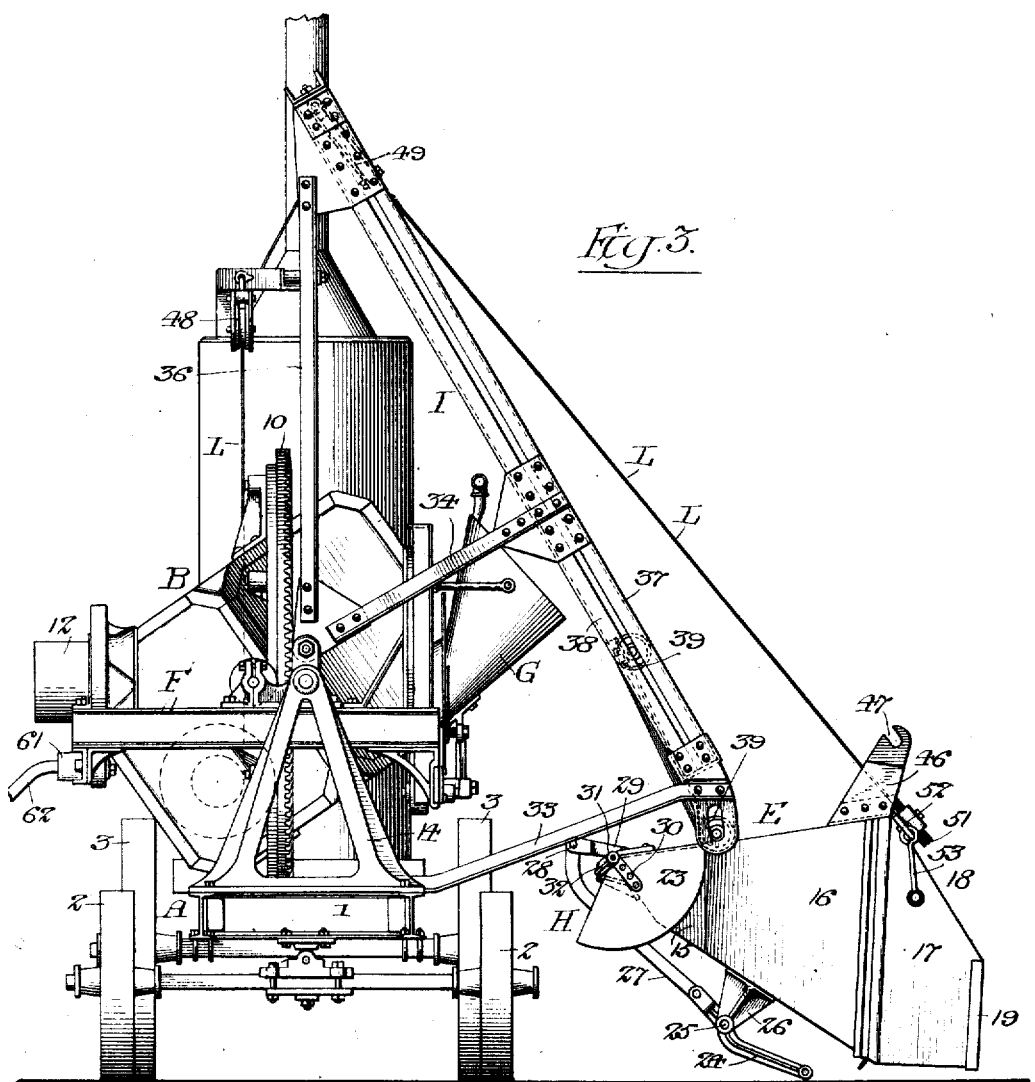

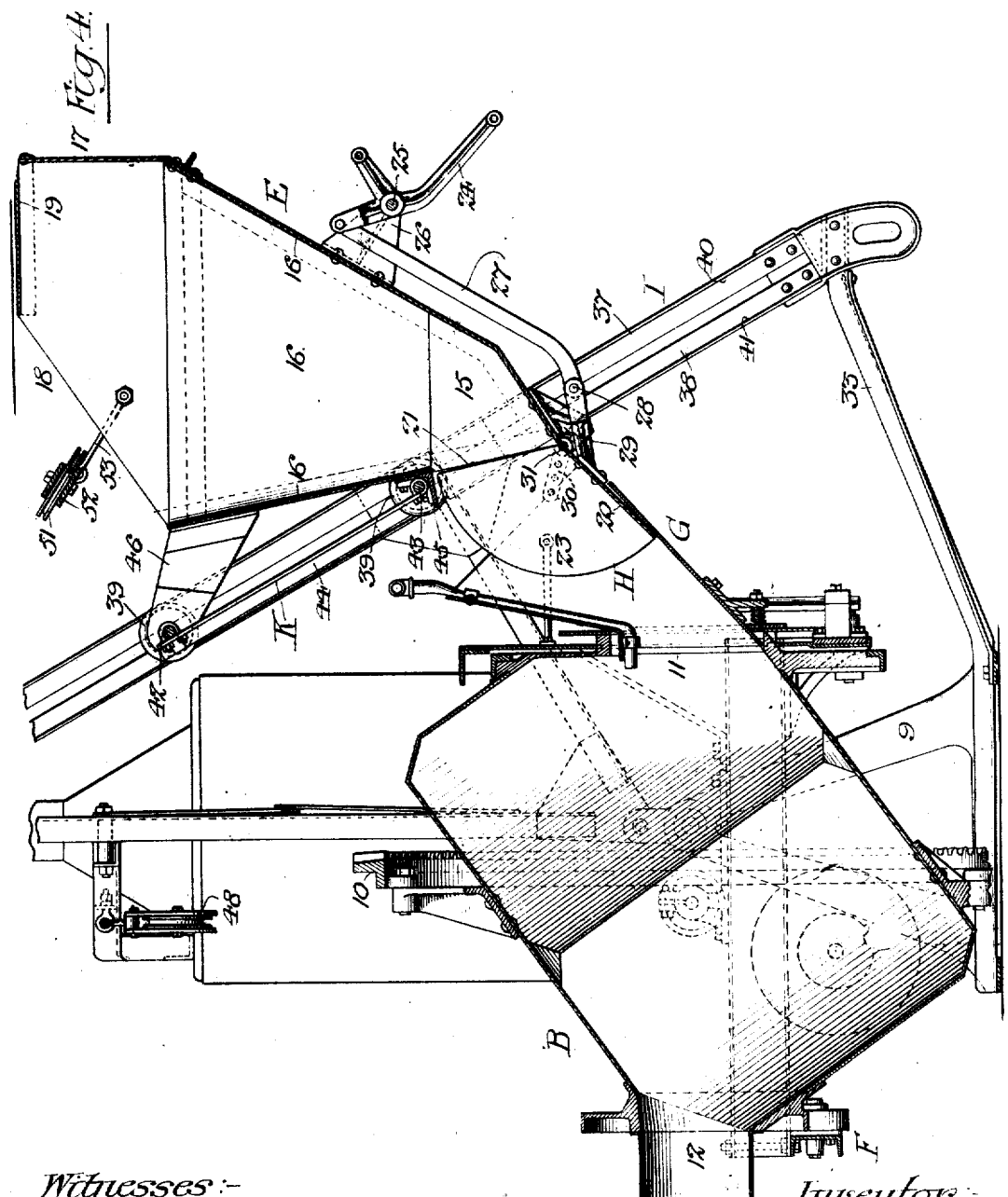

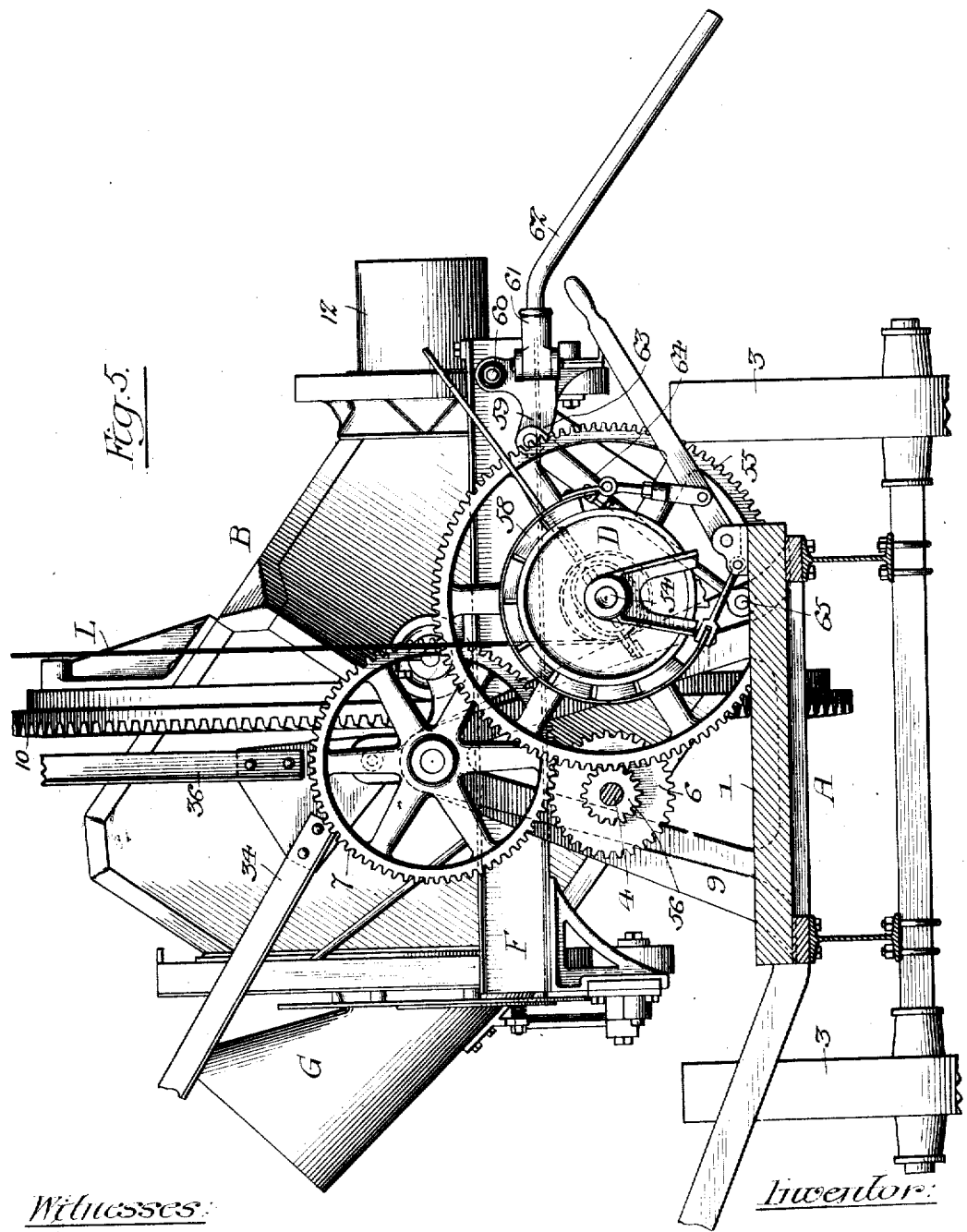

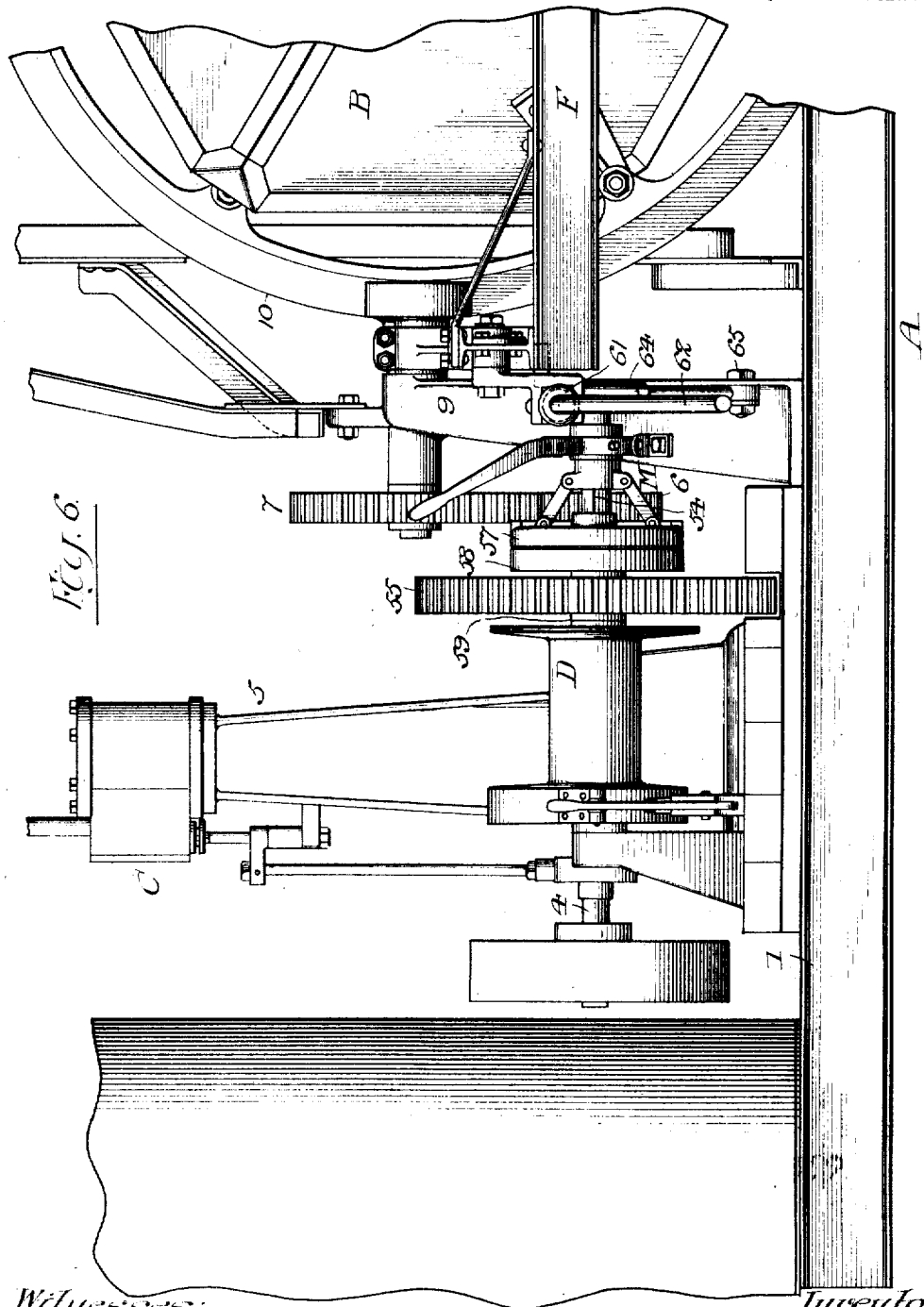

CHARLES E. BATHRICK, OF CHICAGO, ILLINOIS, ASSIGNOR TO FREDERICK C. AUSTIN, OF CHICAGO, ILLINOIS.

MIXER FEED DEVICE.

No. 920,415.  Specification of Letters Patent.  Patented May 4, 1909.

Application filed February 15, 1906. Serial No. 301,248.

*To all whom it may concern:*

Be it known that I, CHARLES E. BATHRICK, a citizen of the United States, residing at Chicago, in the county of Cook and State of Illinois, have invented certain new and useful Improvements in Mixer Feed Devices, of which the following is a specification.

My invention relates to a mixer feed device of the kind in which the material is elevated to a point where it is discharged and delivered to a mixer for making concrete, mortar and the like.

The objects of my invention are, to provide a compact and efficient automatic side loader for feeding mixers; to avoid detaching the side loader from a carriage supporting a mixer and motor; to balance the side loader mixer and motor or engine upon a carriage which can be moved to and stationed at any desired point for loading and mixing; to provide a hopper which can be swung outwardly and downwardly into recumbent position for loading, as by dumping a wheelbarrow or by shoveling, and in alternation therewith swung upwardly into an upright position and elevated so as to bring its discharge opening to a proper point for discharging into an opening communicating with the receptacle into which the contents of the hopper is to be unloaded or discharged; and to provide various other matters of construction and arrangement serving to the attainment of an efficient and exceedingly useful device.

In the accompanying drawings: Figure 1 is a side elevation of a wheeled carriage or vehicle provided with a mixing machine and my improved feed device. Fig. 2 is an end elevation of Fig. 1, the elevating hopper receptacle being elevated and in position for charging the mixing receptacle. Fig. 3 is a like elevation showing the hopper or receptacle in its lowered receiving position. Fig. 4 is a section on a vertical central plane through a portion of the apparatus on a larger scale than in preceding figures, the section being principally through the mixing receptacle and the elevated hopper. Fig. 5 mainly shows in elevation the mixing receptacle and a portion of means for operating the mixing receptacle and a hoist, the elevation being the result of a section taken transversely through Fig. 1 on line x—x, and the view being on a larger scale than the view in Fig. 1. Fig. 6 is a side elevation on an enlarged scale showing operating devices for actuating the mixing receptacle, and a drum D for the cable hoist.

A indicates a wheeled carriage constructed with a suitable body 1 having front wheels 2 and rear wheels 3. The rotary mixing receptacle B is supported over the forward portion of the body, the rear portion of such body being utilized as a support for an engine or motor C. The engine or motor C is of any suitable type and serves to drive the rotary mixing receptacle B, and also to operate a winding drum D when it is desired to revolve such drum in a direction to elevate a supply hopper E into position for discharging its contents into the rotary mixing receptacle, as hereinafter more particularly described.

The rotary engine shaft 4 is arranged longitudinally with relation to the carriage, and is supported at one side of a base support 5 for the engine. This rotary engine shaft is provided with a driving pinion 6 (best shown in Fig. 1), which engages and operates a gear wheel 7 arranged over the pinion. The gear 7 is secured upon one end portion of a short rotary shaft having its opposite end provided with a bevel gear 8, the shaft thus provided with gears 7 and 8 being supported by any suitable bearing on a standard 9 substantially midway of the length of the carriage body. The bevel gear or pinion 8 engages a ring gear 10 on the mixing receptacle, and by this simple connection between the engine and the mixing receptacle, the latter is revolved continuously during the operation of charging, mixing and discharging. The rotary mixing receptacle is provided with an inlet 11 (Fig. 4), and an outlet 12, and is supported to revolve about an axis with which said openings are concentric or substantially so. The mixing receptacle is mounted to thus revolve upon a tilting frame F, said frame being suspended by hangers 13 from suitable bearings respectively on standard 9 and on a corresponding and oppositely arranged standard 14, it being observed that the standard 14 is upon the forward end portion of the carriage body, and that the mixing receptacle is hung to tilt about an axis which is longitudinal with relation to the length of the carriage body and in a vertical plane midway or substantially midway of the width of the carriage body so as to maintain a suitable balance. The tilting frame F which supports the rotary mixing receptacle, is provided at one end with a chute G, which is secured upon the tilting frame so as to move with the latter. The mixing receptacle is arranged above the body of the vehicle and as the latter is mounted on wheels, it is desirable to provide means for raising and lowering the hopper, so that during operation, the hopper can be lowered and charged from wheelbarrows on the ground level, and then raised so as to permit it to discharge into the mixing receptacle when the latter is in position for mixing.

The hopper E is constructed with an outlet portion 15 and side walls 16, which flare upwardly from its said outlet portion 15, the upper portion of the hopper being formed or provided with a partially covered upward extension 17, having a receiving opening 18 (Fig. 4), formed on an incline to a vertical central line through the hopper, or in other words, the sides 16 are extended upwardly to form the upward extension 17, which is partially closed by the overhanging upper end 19, thereby leaving between, the opening 18, having two inclined side edges. When therefore the hopper thus shown in Fig. 2 has been lowered to the ground as in Fig. 3, its opening 18 will stand as an upwardly exposed doorway into which materials can be readily dumped from wheelbarrows or thrown by shovels. When the hopper is down as in Fig. 3, its central longitudinal line or axis which is vertical in Fig. 4 is now substantially horizontal, it being also observed that when the hopper is in position for filling as in Fig. 3, the plate or end portion 19 which partially closes the outer larger end of the hopper, is vertical or substantially so and permits a suitable quantity of materials to be thrown into and retained within the hopper. By forming the mouth or receiving opening 18 of the hopper on a plane which is inclined to the axis of the hopper, the materials can be more readily dumped into the hopper when the latter is in its receiving position. The hopper is provided at its discharge end with a swinging valve device H. This valve device which is best shown in Fig. 4, is constructed with a plate 20 arranged for closing and opening the outlet 21 of the discharge end portion 15 of the hopper, and this valve plate 20 is also provided with two oppositely arranged side plates 22 and 23, which are in the nature of flange plates along two longitudinal edge portions of the valve plate 20. The valve device H is hung upon the hopper so that it can be swung outwardly to form a temporary trough-like extension of the outlet portion 15 of the hopper, as in Fig. 4, and in alternation therewith swung in direction to bring the valve plate 20 in position to close outlet 21 of the hopper and permit its side plates 22 and 23 to embrace opposite sides of the lower discharge portion 15 of the hopper. The valve device H is operated by a lever 24 which is pivoted at 25 upon a bracket 26 on the hopper, the short end of said lever being pivotally attached to one end of a rod or bar 27, which has its opposite end pivoted at 28 to an arm 29 secured to the valve plate 20. The lever 24 can be operated to open the valve device H as in Fig. 4, and it can also be operated to close and lock the valve device as in Fig. 3, wherein the short arm of the lever and the rod 27 have been brought into alinement or on a dead center so as to temporarily lock the valve device.

In order to permit the valve device to swing for purposes hereinbefore mentioned, it is provided upon each side with a plate or metal strap 30 (Fig. 3), which is rigidly secured to the valve device, said two plates 30 being provided at their outer end with a transversely arranged pivot 31, which is attached to substantially U-shaped hinge leaves 32 (Fig. 1), each having one leg supporting the pivot and having its remaining leg secured to the lower portion of the hopper, as best illustrated in Fig. 1.

The hopper is raised and lowered upon an inclined track I arranged at one side of the machine and suitably supported by braces 33, 34, 35 and 36, arranged in any suitable mechanical way. The track I comprises two guide rails, each of said guide rails being in turn formed by two angle bars 37 and 38 arranged so that the space between the inner flanges of each pair of said angle bars forms a longitudinal guide way for the wheels 39 of a truck K, it being understood that each wheel is flanged at one end and that its tread or bearing portion is of less diameter than the space between the two flanges forming a guide for the wheel, and that when the truck is moved up or down, the bearing portions of its wheels will roll upon the inner sides or flanges 41 (Fig. 4), or upon the inner sides of the flanges 40 of the track as it may happen. The truck K is of simple construction being merely the two axles 42 and 43 connected by side plates or bars 44 and provided with the flanged wheels 39, illustrations of the truck being best afforded by Figs. 1 and 2. The axle 43 of the truck is permanently attached to the hopper at a point adjacent to the hopper outlet as in Fig. 4, and to such end a bearing on the axle 43 is provided by a bar 45 (Fig. 1) arranged transversely to the track and secured to what may be termed the front side of the hopper. The lower truck axle 43 provides a hinge connection between the lower portion of the hopper and the lower portion of the truck, and permits the hopper to be swung about the axis of said truck axle 43. The upper larger end portion of the hopper is provided at its front side with a catch device for engaging the truck when the hopper is swung into the position shown in Fig. 4, a simple arrangement being to provide the hopper with one or more—preferably two—forwardly projecting catches or catch arms 46, each having a notch 47 arranged to engage with the upper truck axle 42 when the hopper is swung from its receiving position into its discharging position.

As a means for raising and lowering the hopper together with the truck to which the hopper is attached, a cable L is applied to and extended from the rotary winding drum D up to and over an elevated sheave 48 (Fig. 1), thence to and over a suitable sheave in a sheave block 49 suspended from a cross-bar 50 at the upper end of the inclined track, thence downwardly to and under a sheave 51, which is connected with the hopper, and thence upwardly to the sheave block 49 to which its terminal is secured as in Fig. 1. The sheave 51 is suitably journaled upon a cross plate or bar 52, said bar 52 being arranged transversely to the line of track, and being hinge-connected with the hopper by a pair of links 53 (Fig. 1), so that while the sheave 51 can assume the position shown in Fig. 4, it can also be made to assume the position shown in Fig. 3, wherein the cross-bar 52 is temporarily against the hopper. After the hopper has been charged, it can be raised from the position shown in Fig. 3 into the position shown in Figs. 1, 2 and 4, by operating the winding drum in a direction to wind thereon the cable L. The cable while thus operating will swing the hopper about the axis of the lower axle 43 of the truck until the catch 46 of the hopper engages the upper truck axle 42, thereby bringing the longitudinal axis of the hopper into an upright position, and also bringing the hopper into position for discharge, it being observed, however, that at this time the discharge outlet of the hopper is closed by the valve device H. Further operation of the cable L serves to draw the truck upwardly along the inclined track and this operation is continued until the now upright hopper reaches a position for discharging into the mixing receptacle, and when the hopper reaches such point, the operation of the winding drum D can be arrested by any suitable means. When the hopper thus arrives at the position shown in Fig. 4, the valve device H is opened by means of the lever 24 and permitted to swing forwardly into the chute G, which is arranged to register with opening 11 of the mixing receptacle and suitably supported upon the tilting frame F, thereby permitting the hopper to charge the mixing receptacle.

As one way of connecting and disconnecting drum D with and from the engine shaft 4, said drum is supported by a rotary shaft 54 (Fig. 5) and this shaft is also provided with a gear 55 (Fig. 6), which engages a driving pinion 56 secured upon the engine shaft 4. The gear 55 can be connected with the drum B by a clutch device M (Fig. 6), said clutch device being splined to slide along and rotate with shaft 54 and being constructed with a clutch face or member 57, which can be thrown into engagement with a clutch member 58, it being understood that the gear 55 and clutch member 58 are secured upon a sleeve 59 which is loose on the shaft 54, and that the drum D is secured to shaft 54 which extends through the sleeve 59. When it is desired to lower the hopper, its valve gate H can be closed and the hopper can be allowed to descend by gravity, the winding drum B being free to revolve, but being controlled however by a hand brake device 58$^a$. As a means for tilting the frame F upon which the mixing receptacle is mounted, a substantially bell-crank device 59$^a$ is pivoted to one side of the tilting frame as at 60 and provided with a socket 61 for a handle 62. The bell socket 61 forms one arm of the bell-crank and to the opposite arm 63 of the bell-crank is pivoted a longitudinal adjustable link 64, the upper end of said link being pivoted to the bell-crank, while its lower end is pivoted to a fixture on the body frame as at 65. By operating the handle 62, the frame F can be readily tilted.

With further reference to the general arrangement of the device or machine illustrated, the lower or bottom apical portion of the hopper is provided with a suitable valve controlled discharge opening, while its upper receiving end portion is practically provided with a lateral or side receiving opening which has an upward exposure when the hopper is in a recumbent position, and that by reason of such laterally exposed receiving opening, the hopper can be charged or loaded as by dumping the contents of a barrel into such opening or by shoveling material therein. But as soon as the charged hopper swings upwardly, the material will not spill out from the side receiving opening and will gravitate toward the discharge opening. It will also be seen that I provide a portable support or carriage sustaining a rotary mixer having its axis transverse to the length of the carriage and that the mixer arranged as illustrated, tends or serves to counterbalance the inclined track which is supported at its lower end at one side of the carriage and thence extended upwardly above the latter, and also, that the mixer serves to counterbalance the hopper which operates at one side of the carriage, as hereinbefore described. With reference to the end piece 19, its width is proportional to the desired convenience of dumping material into the hopper through its laterally exposed receiving opening 18.

As illustrated in the drawings the opening 18 is on a plane oblique to and intersecting a line which may be properly termed the longitudinal axis of the hopper. This opening 18 however is also practically lateral to said axis or length of the hopper, so that when the hopper is projected outwardly as in Fig. 3 and thereby in a recumbent or substantially recumbent position, the opening or entrance 18 is presented upwardly for purposes hereinbefore described, and when the hopper is projected upwardly as or substantially as in Fig. 4, the opening 18, broadly considered, is lateral to the length or longitudinal axis of the hopper. It will also be seen from the foregoing description that the hopper is pivotally connected with an inclined track structure by means arranged for up and down movement along an inclined way or guide, whereby the axis to which the swinging hopper is tied can be lowered and raised in alternation.

What I claim as my invention is:

1. The combination of a portable base and an inclined track structure supported thereon, the lower end portion of the inclined track structure being toward one side of the portable base and its upper end portion being extended above the latter; a swinging hopper having one end portion provided with a receiving opening which is lateral or substantially lateral to the length of the hopper, and having its opposite end portion provided with a discharge opening; pivotal connecting means between the hopper and the inclined track structure, said pivotal connecting means being movable up and down along the inclined track structure for raising and lowering the axis about which the hopper swings, and the hopper being tied to such axis to permit it to swing toward an outwardly projecting position for loading and conversely to swing back toward an upwardly projecting position for discharging; and raising and lowering means for swinging the hopper about the axis to which it is tied to oscillate and for bodily raising and lowering the hopper together with its pivotal connection with the inclined track structure.

2. The combination of a base provided with an upwardly extending track structure; a swinging hopper; pivotal connection between the swinging hopper and the inclined track structure and comprising a transverse member having wheel or roller bearings arranged to traverse an inclined track portion of said track structure for elevating and lowering a transverse axis about which the hopper swings; and a cable hoist for swinging and bodily raising and lowering the hopper and said transverse axis; the hopper being constructed with a receiving end portion partially covered by an overhanging end wall, and having at such end portion a side receiving opening on a plane intersecting the longitudinal axis of the hopper, the opposite end portion of the hopper being tied to the transverse pivotal axis.

3. The combination of a portable base support provided with an upwardly extending track structure; a hopper; a member arranged to traverse an inclined way along the said track structure and forming a shifting hinge connection between the apical portion of the hopper and the track structure; and a cable hoist connecting the hopper with the upper portion of the track structure; the hopper being constructed with an end portion 19 and a side opening 18 arranged to open upwardly when the hopper is in recumbent loading position, and the cable hoist being arranged for lowering the hopper and for permitting the hopper to swing outwardly and project laterally out from the lower portion of the track structure.

4. The combination of an inclined track structure provided with a pair of longitudinally extending parallel ways; a transverse axle having end rolls which traverse said ways; a swinging hopper having a receiving end portion and an opposite discharge end portion and having its discharge end portion attached to the said axle to permit the hopper to swing about the axis of the latter; cable hoisting means for swinging the hopper between an upright discharging position and a horizontal or substantially horizontal receiving position, said cable means being also adapted for bodily elevating the hopper to an extent to draw the axle upwardly and conversely to bodily lower the hopper and said axle; and rolls or wheels for backing the upper hopper portion against the inclined track structure when the hopper is drawn bodily upwardly in an upturned position.

5. In a side loader for feeding mixers, a portable base support; an inclined track sustained upon said support and having its lower end portion at one side of the support and its upper portion extending above the same; a hopper having its apical portion provided with a valved discharge outlet and having its upper portion provided with a lateral side opening 18; means for providing a shifting pivotal connection between the hopper and the track; means for operating the valve and means for bodily raising and lowering and for laterally swinging the hopper for the purpose set forth.

6. In a side loader for feeding mixers, an upwardly extending inclined guide way or track; a hopper having a lower valved discharge opening and an upper receiving opening at one side of the longitudinal axis of the hopper, a shifting pivotal connection between the hopper and the guide track; means for bodily raising and lowering and for swinging the hopper laterally to the guide track, the upper portion of the hopper being formed with wall portions 17 and 19 to form a receptacle portion when the hopper is lowered into a recumbent position.

7. The combination in a mixer feeding device, of a truck; a guide track for directing the truck upwardly and downwardly; a hopper having its discharge end portion hinged upon the lower end portion of the truck and arranged to swing from an upwardly extending position to a position extending outwardly from the truck; raising and lowering means for drawing the hopper and truck upwardly; a catch device for connecting the upper end portion of the hopper with the truck when the hopper is in an upwardly extending position; and a valve for opening and closing the discharge opening of the hopper.

8. The combination with a wheeled carriage, of an inclined guide track supported upon the carriage; a truck arranged to traverse the inclined guide track; a hopper for the purpose described pivoted toward its discharge end upon the truck; a cable hoist attached to the hopper; and a valve for opening and closing the discharge opening of the hopper; the said hopper being hung to swing outwardly and laterally to the carriage for the purpose set forth.

9. The combination with a carriage, of a guide track extending upwardly from one end and supported upon the carriage; a wheeled truck arranged to traverse the guide track; a hopper for the purpose described hung upon the truck and arranged to swing up into discharging position and downwardly into position for receiving, the mouth of the hopper being formed to permit material to be fed into and contained within the hopper when the said hopper is in position to extend outwardly from the truck; a cable hoist for raising and lowering the truck and hopper and for swinging the latter from its receiving to its discharging position for the purpose set forth.

10. In a mixer feed device, a track constructed with inclined guide rails; a truck for traversing the track; a hopper hinged on the truck; a valve for opening and closing the discharge opening of the hopper; a cable hoist operating the truck, and mechanism for operating the mixer and the hoist.

11. The combination of a receptacle for the purpose set forth; a guide track arranged opposite the receiving portion of the receptacle and extending above and below the same; a truck arranged to traverse the guide track; a hopper hinged below its receiving end on the truck and arranged to swing downwardly and outwardly from the truck to bring it into receiving position, and to swing upwardly and toward the truck to bring it into position for charging the receptacle; means for swinging the hopper on the truck; and a valve for opening and closing the discharge opening of the hopper, the said hopper being projected laterally from the truck and track when in position for receiving, and being upright or substantially upright when it is in position for charging the receptacle for the purpose described.

12. The combination of a wheeled carriage; an inclined hopper guide supported upon the wheeled carriage, the upper portion of said guide being above the carriage and its lower end portion being extended out from one side of such carriage; a swinging hopper having a shifting connection with the guide; means for raising and swinging the hopper into position to permit its apical discharge portion to discharge at a point over the carriage, and in alternation therewith for lowering the hopper and permitting it to swing in direction away from the carriage and to assume a recumbent or substantially recumbent position for receiving material at its charging end farthest from the carriage; and valve means for opening and closing the discharge opening at the apical portion of the hopper, the opposite end portion of the hopper being formed with a lateral or substantially lateral opening to receive material by shoveling or barrow.

CHARLES E. BATHRICK.

Witnesses:
CHAS. G. PAGE,
OTTILIE C. FREIBERG.